United States Patent
Lotspiech et al.

(10) Patent No.: US 7,630,497 B2
(45) Date of Patent: Dec. 8, 2009

(54) SYSTEM AND METHOD FOR ASSIGNING SEQUENCE KEYS TO A MEDIA PLAYER TO ENABLE HYBRID TRAITOR TRACING

(75) Inventors: Jeffrey Bruce Lotspiech, Henderson, NV (US); Hongxia Jin, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 770 days.

(21) Appl. No.: 11/230,843

(22) Filed: Sep. 19, 2005

(65) Prior Publication Data
US 2007/0067242 A1 Mar. 22, 2007

(51) Int. Cl.
*H04L 9/00* (2006.01)
*G06F 21/00* (2006.01)

(52) U.S. Cl. .................... 380/277; 380/201
(58) Field of Classification Search ........ 380/200, 380/201, 203, 277; 713/150, 155, 156, 168, 713/173, 175, 182, 183, 185, 193; 705/57, 705/59
See application file for complete search history.

(56) References Cited

U.S. PATENT DOCUMENTS

| | | | | |
|---|---|---|---|---|
| 4,491,725 A * | 1/1985 | Pritchard | ............. | 705/2 |
| 5,117,358 A * | 5/1992 | Winkler | ............. | 708/135 |
| 5,832,447 A * | 11/1998 | Rieker et al. | ............. | 705/2 |
| 6,285,774 B1 | 9/2001 | Schumann et al. | | |
| 6,556,679 B1 | 4/2003 | Kato et al. | | |
| 6,587,826 B1 * | 7/2003 | Laneman et al. | ............. | 704/503 |
| 2001/0052073 A1 * | 12/2001 | Kern et al. | ............. | 713/161 |
| 2002/0076205 A1 | 6/2002 | Asada et al. | | |
| 2002/0133701 A1 | 9/2002 | Lotspiech et al. | | |
| 2002/0141582 A1 | 10/2002 | Kocher et al. | | |
| 2002/0159593 A1 | 10/2002 | Sako et al. | | |
| 2003/0169885 A1 | 9/2003 | Rinaldi | | |
| 2003/0187534 A1 * | 10/2003 | Suzuki et al. | ............. | 700/107 |
| 2003/0212642 A1 * | 11/2003 | Weller et al. | ............. | 705/67 |
| 2004/0034787 A1 | 2/2004 | Kitani | | |
| 2004/0111611 A1 | 6/2004 | Jin et al. | | |
| 2004/0128259 A1 | 7/2004 | Blakeley et al. | | |
| 2004/0133794 A1 | 7/2004 | Kocher et al. | | |
| 2004/0153941 A1 | 8/2004 | Muratani | | |
| 2005/0141704 A1 | 6/2005 | Van Der Veen | | |

OTHER PUBLICATIONS

"Traitor Tracing for Perecorded and Recordable Media", Hongxia Jin, Jeffery Lotspiech, and Stefan Nusser, DRM'04 Oct. 25, 2004. ACM. pp. 83-90.*

(Continued)

*Primary Examiner*—Gilberto Barron, Jr.
*Assistant Examiner*—Simon Kanaan
(74) *Attorney, Agent, or Firm*—Samuel A. Kassatly; Shimokaji & Associates, P.C.

(57) ABSTRACT

A hybrid traitor-tracing enabling system comprises an inner code and a multi-level outer code. The inner code comprises encrypted tables comprising codewords for file segment variations. One level of the multi-level outer code comprises assignments of a cluster of sequence keys to manufacturers or models of media players. Another level comprises assignments to the media players of sequence keys within the cluster. The system enables tracing of only a manufacturer or model, or a manufacturer, model, and a media player. When tracing a manufacturer or model, the system enables detection with relatively few recovered files. With additional recovered files, the media player used for piracy can be discovered. Furthermore, the present system enables detection of collusion between manufacturers or models and collusion between individual media players.

19 Claims, 11 Drawing Sheets

OTHER PUBLICATIONS

Hongxia Jin et al., "Traitor Tracing for Prerecorded and Recordable Media," ACM, DRM'04, Oct. 25, 2004, pp. 83-90.

Fernandez-Munoz et al., "Fingerprinting Schemes for the Protection of Multimedia Distribution Rights," Upgrade, Security in e-Commerce, v.III, n.6, pp. 36-40, Dec. 2002, http://www.cepis-upgrade.org/issues/2002/6/upgrade-vIII-6.pdf.

Silverberg et al., "Applications of List Decoding to Tracing Traitors," a version of this paper appeared in ASIACRYPT 2001, 2001, http://www.math.unl.edu/~jwalker/papers/taipp.pdf.

Lin et al., "Advances in Digital Video Content Protection," Proc. of the IEEE, v.93, n.1, pp. 171-183, Jan. 2005, http://shay.ecn.purdue.edu/~linet/Papers/IEEE-Proc-2005.PDF.

Kocher et al., "Self-Protecting Digital Content," Technical Report from the CRI Content Security Research Initiative, Cryptography Research, Inc. (CRI), 2002-2003, http://www.cryptography.com/resources/whitepapers/Self ProtectingContent.pdf.

\* cited by examiner

SYSTEM AND METHOD FOR ASSIGNING SEQUENCE KEYS TO A MEDIA PLAYER TO ENABLE HYBRID TRAITOR TRACING

FIELD OF THE INVENTION

This invention relates to preventing piracy of digital content in a broadcast encryption system and more specifically to tracing a traitor that may be colluding to redistribute such content or related decryption keys.

BACKGROUND OF THE INVENTION

The widespread transition of data from analog format to digital format has exacerbated problems relating to unauthorized copying and redistribution of protected content. Flawless copies of content can be readily produced and distributed via the Internet. This piracy is a major concern and expense for content providers.

Further, a new type of home consumer device for digital content management has been enabled by the advent of inexpensive, large-capacity hard disks. A movie rental box receives digital movies from some inexpensive source of data, usually a broadcast source (whether terrestrial or satellite-based). The movies do not have to be delivered in real time. Instead, they are stored on the hard disk, so that at any moment the hard disk contains, for example, the hundred hottest movies in the rental market. The consumer can simply select a particular movie and hit "play" to begin viewing a movie. The movie rental box periodically calls a clearing center and reports the content usage of the consumer for billing purposes; the box may also acquire new decryption keys during this call.

This approach to content distribution is a one-to-many type of distribution system such as, for example, distribution of pre-recorded or recordable media, a pay-per-view TV system, etc. The advantages the box provides to the consumer are obvious: he or she no longer has to go to the video rental store, and does not have to return a rental tape or DVD. The consumer value proposition of movie rental boxes is so compelling it is estimated that there will be 20 million such boxes in the United States within five years.

Content providers need to know what security problems are associated with these boxes, i.e. how can a user get a movie without paying for it? The simple attack of merely disconnecting the box so that it cannot call the clearing center can achieve only a short-lived advantage because the clearing center can simply refuse to provide new decryption keys to such a box. Likewise, the periodic "calling home" makes detection of clone boxes relatively easy.

A serious attack is likely to be the so-called "anonymous" attack, wherein a user or a group of users purchase rental movies from legitimate movie rental boxes that have been instrumented so that the protected content or the decryption keys can be captured and redistributed, often over the Internet. This "Napster-style" attack focused on movies instead of music is the most urgent concern of the movie studios that are investigating content protection technology.

One solution to the problem is to differently watermark and differently encrypt each movie for each authorized movie rental box, so that if a movie were pirated the watermarking and encryption information can uniquely identify the compromised box. However, this solution is not feasible because of the excessive computing effort and transmission bandwidth required to prepare and transmit individualized movies. The distribution system is economical only if the movies can be distributed over broadcast channels, i.e., every box gets substantially the same data at the same time.

To solve the broadcast problem, the approach known in the art as "traitor tracing" is used. In this conventional approach, an original version of each movie file is augmented before being broadcast. Specifically, the file that is actually broadcast has at least one critical file segment replaced by a set of segment variations. Each file segment variation is differently encrypted before encryption, or differently encrypted and watermarked before encryption. The entire file may also be watermarked. All the variations in one segment are identical for viewing purposes. A receiver is given the cryptographic key to decrypt only one of the variations in each segment. If the receiver is compromised and is used to illegally rebroadcast either the keys or the segments themselves, it is possible to deduce which receiver or receivers have been compromised. Although this technology has proven to be useful, it would be desirable to present additional improvements. The traitor-tracing approach has not been widely used in practice to date, because previously known methods required unreasonable amounts of bandwidth in the broadcast, due to the number of segments or variations required.

One conventional solution using a traitor-tracing approach equips authorized users with security devices that can decode content; unauthorized clients do not have decoding capabilities. A traitor detection system generates different decoding capabilities and creates a file that associates the decoding capabilities with specific authorized clients. In the event an authorized user illicitly transfers content to an illegitimate user, this conventional approach consults the association file to identify one or more of the authorized clients associated with the illicitly transferred decoding capabilities.

Although this technology has proven to be useful, it would be desirable to present additional improvements. This approach requires a broadcaster to dynamically change the segment variations assigned to the individual receivers "on the fly", based on instantaneous feedback on the re-broadcasted data. This conventional approach is not useful for applications such as rental movie boxes, because the pirate has no urgent need to immediately rebroadcast the movies. For example, the pirate can wait for months without losing substantial revenue, if that helps the pirate defeat a traitor-tracing scheme.

Another conventional approach comprises a traitor-tracing scheme against re-digitization and anonymous attacks. This conventional approach assigns codes to variations of content; the assigned codes are similar to error-correcting codes. The content typically comprises 255 different movie sequences, each movie having 256 variations. After 255 movies, the assignment repeats.

By adding a level of indirection, each media player needs to store only 255 keys, corresponding to the 255 movies in the sequence; each of these 255 keys is referred to a "sequence key". The assignment of these keys is based on the "outer code" of this conventional approach, corresponding to a sequence of 255 movies. Each sequence key in the sequence of 255 movies has 256 versions, corresponding to the 256 movie versions. Each media player has the 255 sequence keys, installed when the media player is manufactured.

It might be beneficial to consider the sequence keys as being organized in a matrix. In the example above, the matrix would have 255 columns, one for each movie in the sequence, and would have 256 rows, one for each movie version. A given media player would have exactly one sequence key in each column. Which row each key would have would be set by the outer code.

To continue with the example, when requested to play a movie, the media player determines which sequence number the movie is using, 0 to 255. The sequence number is stored on the movie disc. For an exemplary sequence number 44, the media player combines a sequence key #44 stored on the media player with cryptography values comprising a media key in use on the disc to calculate a movie unique key. The media player knows the version of the sequence key #44 stored on the media player. For exemplary purposes, a version #141 of sequence key #44 is stored on the media player. The media player then uses sequence key to decrypt version #141 of the movie.

Although this technology has proven to be useful, it would be desirable to present additional improvements. The traceability of this approach is partially dependent on the number of variations per segment. Larger numbers of variations per segment provide improved traceability. The selection of the number of variations per segment is affected by watermarking efficiency and the bandwidth allowed by the application scenario. For example, choosing 256 variations per movie where the segments where the variations exist comprise a 2 second scene requires about 5-10% extra bandwidth. The small number of variations chosen due to these restrictions partially adversely affects the traceability of the scheme.

In a re-digitization attack, attackers redistribute the decrypted clear content. However, in an anonymous key attack, attackers simply redistribute the decryption keys for the content. The key attack is considered the more likely attack against the encrypted content. When the attack is redistributing the decryption key, watermark robustness and extra bandwidth are irrelevant. For every recovered movie with q variations, a traitor trace can trace the attack to 1/q of the population, assuming a single user initiated the attack. Higher values of q provide improved traceability. However, higher values of q require additional storage and bandwidth. Thus, an improved traceability for detection of a source of a key attack is desirable that enables a larger number of effective movie variations.

Furthermore, a licensing agent may wish to determine the manufacturer or model of a media player rather than an individual media player. The licensing agent may wish to determine whether a particular model of a media player is faulty or whether a manufacturer is intentionally allowing leaks of decryption keys. If the media player is faulty, the manufacturer can issue, for example, software or firmware updates to owners of the media. Moreover, the licensing agent may limit a trace to manufacturers or models to protect privacy of individual content users. For example, a manufacturer may make an attack against a decryption key by distributing a decryption key or failing to adequately protect a decryption key. In this case, the licensing agent wishes to trace the source of the attack without maligning or harming individual users. It is therefore desirable to have a hybrid approach to traitor tracing that allows detection of any combination of the manufacturer, model, or the individual media player from which a decryption key or content was pirated.

When tracking only to a manufacturer or model, for any file, the individual media players within the same manufacturer or model receive the same file version assignment. However, the individual media players are assigned the sequence keys based on tracing to individual media players rather than manufacturers or models. To extend the capability to manufacturers or models, each table is duplicated 256 times. Each of these 256 tables is then encrypted 256 times, for each of the sequence key versions, resulting in 256*256 tables per file. However, this approach requires a substantial amount of storage on the disk and a substantial amount of bandwidth for transmitting these encrypted tables.

What is therefore needed is a system, a computer program product, and an associated method for assigning sequence keys to a media player to efficiently enable hybrid traitor tracing. The need for such a solution has heretofore remained unsatisfied.

SUMMARY OF THE INVENTION

The present invention satisfies this need, and presents a system, a service, a computer program product, and an associated method (collectively referred to herein as "the system" or "the present system") for assigning sequence keys to a media player to enable hybrid traitor tracing. The present system comprises an inner code and a multi-level outer code. The inner code comprises encrypted inner code tables comprising codewords for a selected set of file segment variations.

The multi-level outer code includes at least two levels. One level of the outer code comprises assignments of a cluster of sequence keys to manufacturers or models of media players. Another level of the outer code comprises assignments of sequence keys to the individual media players within the cluster of sequence keys.

The present system allows a traitor tracer such as, for example, a licensing agent to trace only a manufacturer or model, or a manufacturer, model, and individual media player. When tracing a manufacturer or model, the present system allows detection of the manufacturer or model with relatively few recovered files. With additional recovered files, the individual media player used to pirate encryption keys or content can be discovered. Furthermore, the present system can detect collusion between manufacturers or models and collusion between individual users represented by individual media players. The present system allows the content owner to tune parameters used to trace traitors differently for different files. For example, the content owner can generate a different number of versions for a movie. The hybrid traitor-tracing scheme of the present system is transparent to the media player.

The present system allows the content owner to tune the parameters for the inner code differently for different files, for example, a different number of variations and a different number of segments. Consequently, the parameters can be tuned for a different number of versions for the file. Furthermore, whether the content owner chooses to prepare the movie for the purpose of tracing individual media players or of tracing the manufacturer/model is transparent to the media players. The tracing focus can be a file-by-file decision.

In one embodiment, when the model (or manufacturer) tracing capability of the present system is activated, it might be advisable to deactivate the individual tracing capability.

The number of inner code tables (or mapping tables) stored with the content does not change based on the tracing focus. If the actual number of file versions created for a file is less than the sequence key versions, each file version is encrypted by more than one version of the sequence key for that file.

The present system requires a relatively small amount of storage on the disk and in the media player. The storage requirement on the media player and the number of inner code tables on the disk required for hybrid tracing are independent of the tracing focus.

There are several general types of attacks on content and on encryption keys. One type of attack comprises random individual hacking events. Another type of attack comprises an "evil manufacturer" or a "sloppy manufacturer" who misuses all the keys assigned to them and cause all those keys be exposed. To a lesser extent, attackers reverse-engineer media players from the same manufacturer/model and compromise many keys assigned to the particular manufacturer/model. If the sequence keys are assigned randomly from the entire sequence key matrix, an evil manufacturer can quickly learn all the keys in the sequence key matrix and break the system. In this case, an evil manufacturer attack exposes a large number of sequence keys; this attack is equivalent to many random individual attacks.

System 10 enables an effective defense against attacks from an evil manufacturer and from random individual attacks. The systematic assignment of sequence keys by system 10 to the media players provides a deterministic guarantee of the Hamming distance, thus a minimum overlap between slots of sequence keys assigned to a manufacturer or models. The Hamming distance can be sufficiently large that collusion up to certain number (for example, m, determined by the Hamming distance) of evil manufacturer models cannot completely cover any given sequence keys of an innocent media player. In other words, the probability that the sequence keys of a given media player are covered by m manufacturer models is zero. Conversely, with random assignment, with q clusters, a sequence key of a given media player can be entirely covered by a media player in another manufacturer model with probability $(1/q)$ n where n is the number of sequence keys each media player receives. This probability is small, but not zero. Similarly the probability that a sequence key of a given media player can be entirely covered by more than one manufacturer is not zero.

The present system may be embodied in a utility program such as a hybrid traitor-trace enabling utility program. The present system also provides means for the user to identify a file for encryption and a media player for receiving the file. The present system provides means for the user to invoke the hybrid traitor-trace enabling utility program to encrypt the file such that theft of encryption keys or unauthorized distribution of the file can be traced to the manufacturer, the model, or the media player.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF PREFERRED EMBODIMENTS

Figure 1:
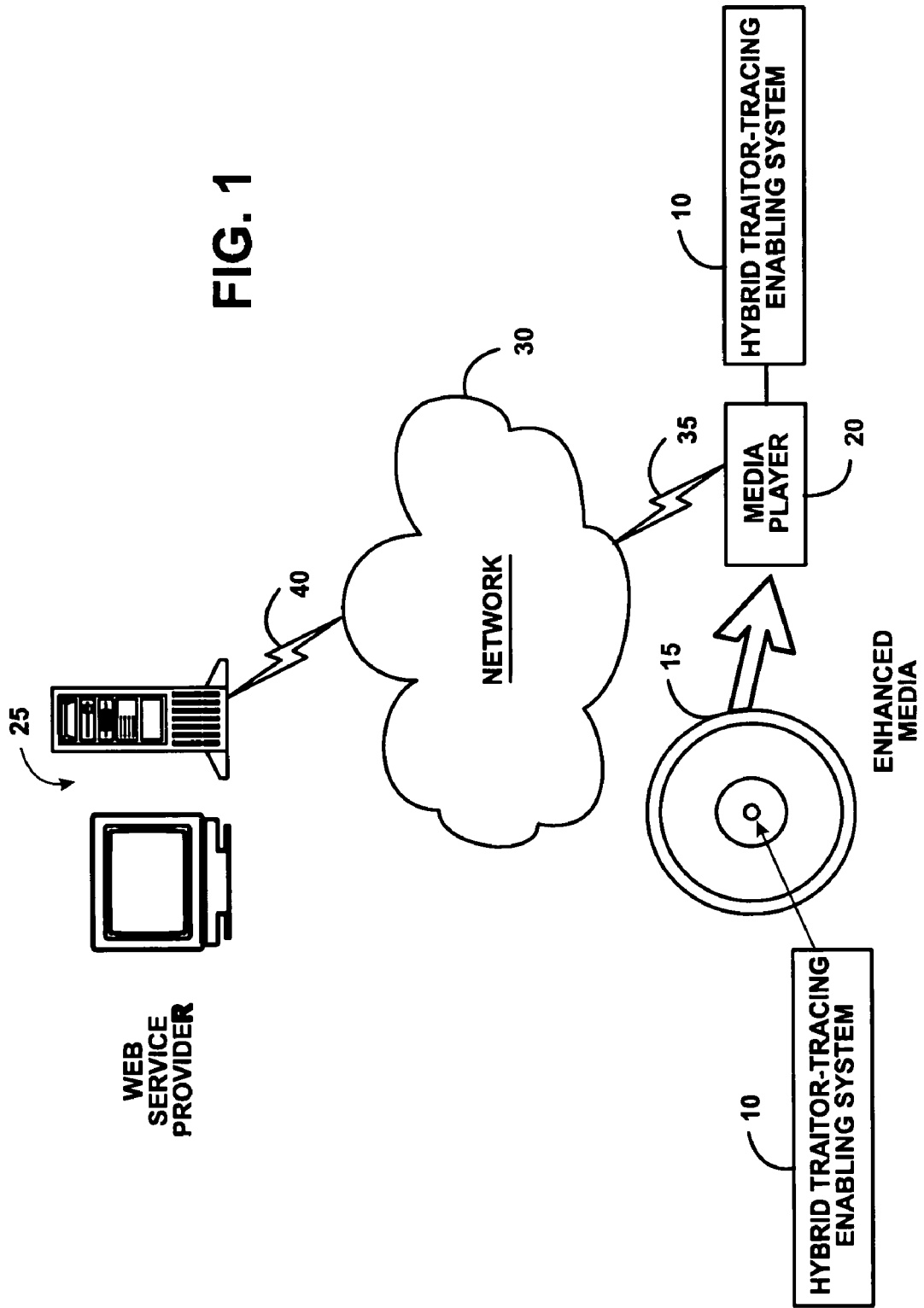
FIG. 1 is a schematic illustration of an exemplary operating environment in which a hybrid traitor-trace enabling system of the present invention can be used.

FIG. 1 portrays an exemplary overall environment in which a system, method, and service for assigning sequence keys to a media player to enable flexible traitor tracing (the "hybrid traitor-tracing enabling system 10" or the "system 10") according to the present invention may be used. System 10 comprises a software programming code or a computer program product that is typically embedded within, or installed on a media 15 and a media player 20. Alternatively, system 10 can be saved on a suitable memory or storage medium such as a diskette, a CD, a DVD, a hard drive, or like devices.

The media player 20 can access a web service provider 25 through a network 30. The media player 20 comprises software that allows the media player 20 to interface securely with the web service provider 25. The media player 20 is connected to network 30 via a communications link 35 such as telephone, cable DSL, satellite link, etc. The web service provider 25 is connected to the Internet through a communications link 40. The media player 20 downloads content from the web service provider 25 and records the content on the media 15. Alternatively, media 15 may be pre-recorded with content such as, for example, movies, audio files, computer programs, or any other type of electronic file. Media 15 may be played on the media player 20.

Figure 2:
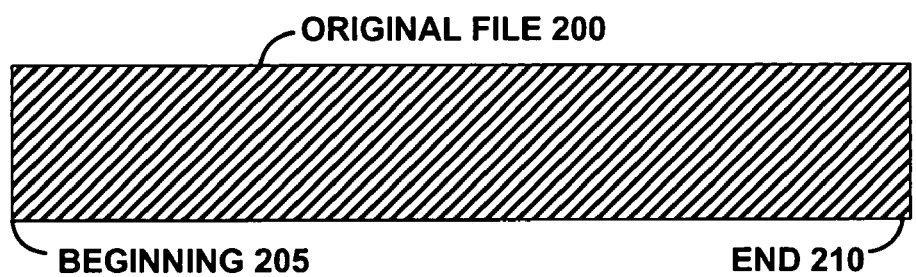
FIG. 2 is a diagram of an original file before segmenting for use by the hybrid traitor-trace enabling system of FIG. 1.

Content on media 15 comprises one or more files. FIG. 2 illustrates a diagram of an original file 200 before processing for use by system 10. Files on media 15 may comprise any kind of digital data sequence, including but not limited to text, audio, images, video, music, files, multimedia presentations, operating systems, software applications, and cryptographic keys. In broad terms, original file 200 comprises a beginning 205 and an end 210 and a span of data. Files may be of any size and may be distributed by any means, including but not limited to computer networks, satellite networks, cable networks, television transmissions, and various physical storage media (e.g. CD-ROMs, DVDs, tapes, etc.) as are known in the art. Files may be broadcast in groups in a substantially continuous sequence, for example, when a stored content of a file rental box of say 255 files is updated, perhaps on a monthly basis. In the file rental box scenario, among others, files are usually not encrypted and otherwise processed "on the fly", but are processed ahead of time.

The present invention is not limited to the file rental box implementation, but instead can be applied to any digital content subject to one-to-many distribution. For example, operators of a web server (generally referred to as a digital rights manager) that sells copyrighted content such as music or other material stored in a subscription database may not want to encrypt or otherwise process files "on the fly" because of the computational expense involved. Similarly, such a server cannot feasibly individually tailor nor store a complete copy of every file it transmits.

Figure 3:
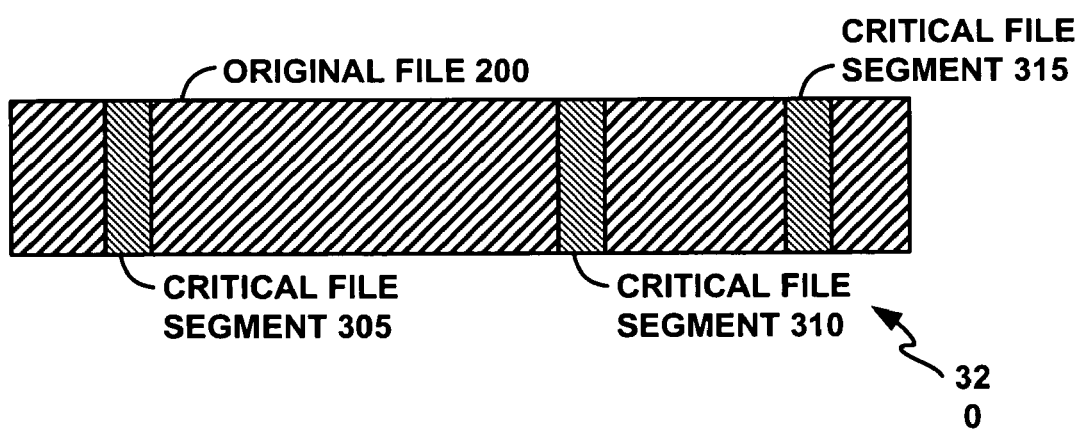
FIG. 3 is a diagram of critical file segments identified in the original file of FIG. 2.

FIG. 3 illustrates a diagram of critical file segments 305, 310, and 315 (collectively referenced as critical file segments 320) in the original file 200, according to an embodiment of system 10. For clarity, only three critical file segments are shown; any number of critical file segments may be used by system 10. In one embodiment, system 10 utilizes approximately 15 critical file segments.

Not all data in a file needs to be protected to the maximum possible level of security; bandwidth can be conserved by selectively applying different levels of security to the most valuable portions of a file. For example, in terms of the file rental box scenario, each file may have scenes that are each absolutely essential for the file to be acceptable to any audience. In this case, all critical file segments in a file require proper processing by the media player 20 for the file to be commercially desirable. In one embodiment, system 10 selects five-second scenes in a typical file as the critical file segments 320. In another embodiment, system 10 selects the critical file segments 320 comprising varying length. In a further embodiment, the critical file segments 320 are equally distributed throughout a given file. In yet another embodiment, the critical file segments 320 are selected based on the contents of the file, possibly by human editors. In the case of executable software files, automated tools may identify the critical file segments 320 according to a measured execution frequency.

Figure 4A:
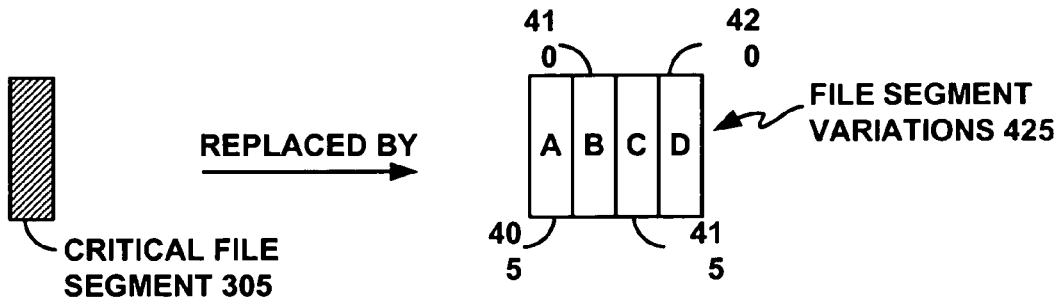
FIG. 4 is comprised of FIGS. 4A, 4B, and 4C and represents diagrams of file segment variations that replace the critical file segments of FIG. 3.
Figure 4B:
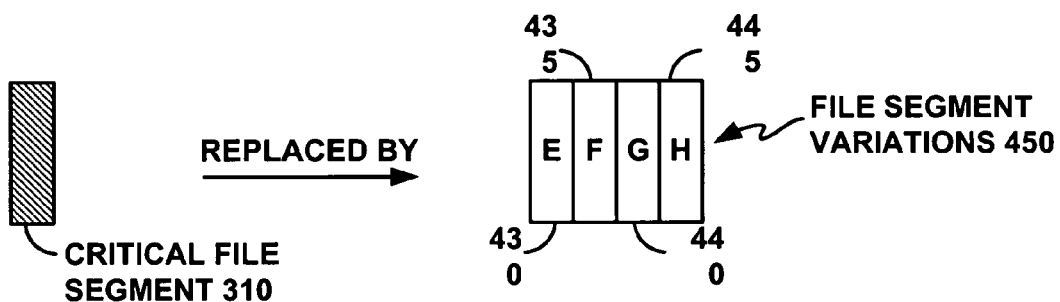
Figure 4C:
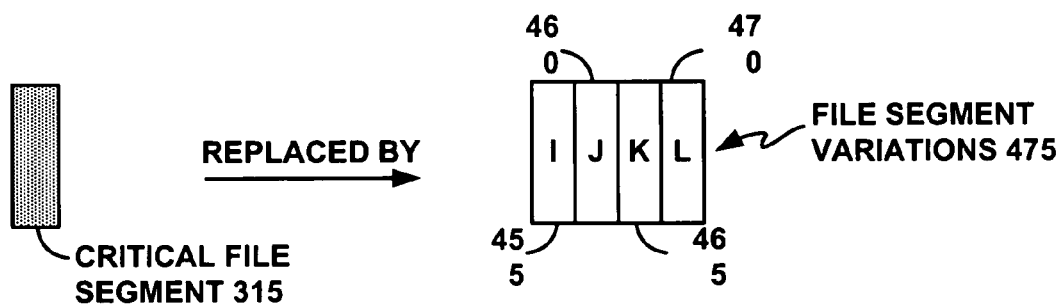

FIG. 4 (FIGS. 4A, 4B, 4C) illustrates diagrams of file segment variations that replace critical file segments. For example, a file segment variation A, 405, a file segment variation B, 410, a file segment variation C, 415, and a file segment D, 420 (collectively referenced as file segment variations 425) replace the critical file segment 305. For clarity, four of the file segment variations 425 are shown for the critical file segment 305; any number of the file segment variations 425 may replace the critical file segment 305. In one embodiment, approximately 16 of the file segment variations 425 are desired. Each of the file segment variations 425 is a copy of the critical file segment 305. Each of the file segment variations 425 is individually watermarked and individually encrypted with an inner code. The entire original file 200 is also typically watermarked and encrypted in a broadcast encryption system.

As described for the critical file segment 305, a file segment variation E, 430, a file segment variation F, 435, a file segment variation G, 440, and a file segment H, 445 (collectively referenced as file segment variations 450) replace the critical file segment 310. Similarly, a file segment variation I, 455, a file segment variation J, 460, a file segment variation K, 465, and a file segment L, 470 (collectively referenced as file segment variations 475) replace the critical file segment 315. For clarity, each of the file segment variations 425, 450, 475 is identified by a text designation (e.g., A, B, C . . . etc.); however, in practice binary numbers are generally employed for this purpose.

The number of the critical file segments 320 and the number of the file segment variations 425, 450, 475 employed by system 10 depends on the properties of the original file 200 and the audience of the original file 200. For movies, one may select a single critical file segment and have several hundred file segment variations; however, attackers may simply choose to omit that single critical file segment in a pirated copy of the movie, in hopes that viewers may not find such a glitch to be overly annoying. A pirated movie missing, for example, 15 critical 5-second scenes is probably too annoying to any viewer for it to be of any commercial value. Thus, the illegally broadcast movies are either substantially disrupted or the attackers incorporate some of their file segment variations, facilitating traitor tracing.

While the number of critical file segments and the number of file segment variations may be kept constant for each file, modifying either number according to an estimated piracy likelihood for a given file is also within the scope of the invention. The number of critical file segments and the number of file segment variations determines the amount of bandwidth overhead (or, alternately, the increased size of the broadcast version of the file). In a typical file, use of 15 critical file segments each having 16 file segment variations. Duration of each of the critical file segments is approximately 5 seconds adding roughly 10% to the file size.

Figure 5:
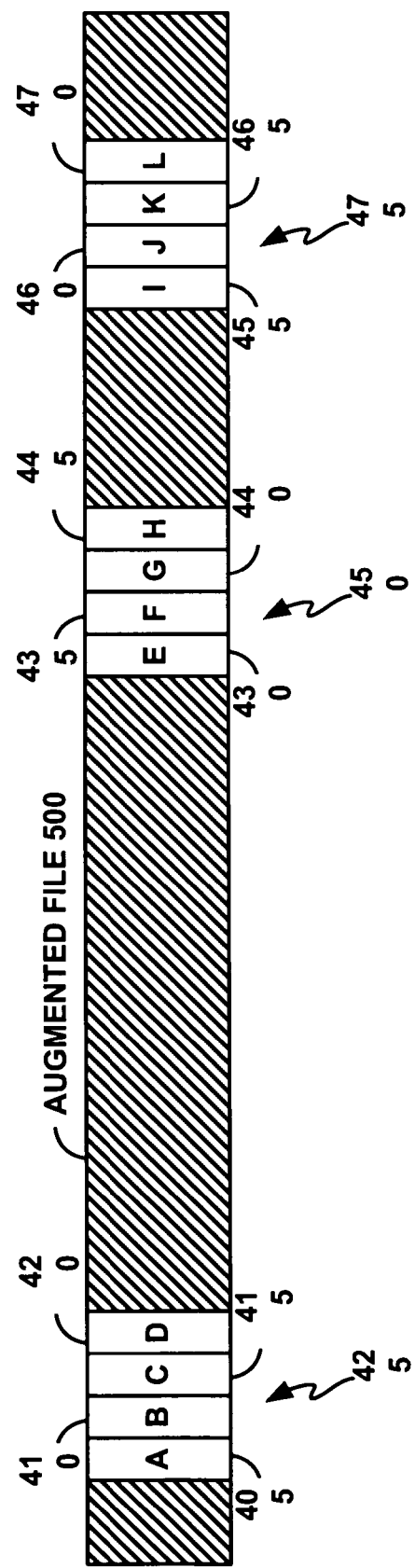
FIG. 5 is a diagram of an augmented version of a file comprising file segment variations for use by the hybrid traitor-trace enabling system of FIG. 1.

FIG. 5 illustrates a diagram of an augmented file 500 comprising file segment variations 425, 450, 475, according to an embodiment of system 10. The augmented file 500 is a version of the original file 200 that may be broadcast. Each intended receiver of the broadcast of a group of files (e.g., the media player 20) requires augmentation selection information to choose a particular combination of file segment variations for each particular augmented file 500. In terms of the file rental box scenario, each file rental box is required to know, for each file, which set of variations to plug into the spaces where critical scenes existed in the original file. The particular arrangement of unmodified file content and file segment variations 425, 450, 475 within the augmented file 500 shown in FIG. 5 is presented for exemplary purposes; any arrangement of unmodified file content and file segment variations may be used.

The augmentations of an original file by replacing critical file segments with file segment variations employed by system 10 facilitate traitor tracing in a commercially viable (i.e. low bandwidth overhead) manner. If a pirated version of a file is found, say on the Internet, the identity of the particular file rental box (or boxes) used to create the pirated version is of keen interest to the broadcaster or content creator (e.g., copyright owners). The broadcaster or content creator may institute legal proceedings against the culprit, and may certainly want to refuse to send new decryption keys to the compromised boxes to prevent future theft. If different boxes are assigned different combinations of file segment variations to use, an analysis of a pirated file can help determine which boxes were used as part of an anonymous attack.

In the event that all of the file segment variations in a redistributed version of a file match the combination of file segment variations assigned to only a single file rental box, conventional traitor tracing systems may identify that box as being the source of the redistributed file. However, attackers are becoming increasingly sophisticated and may choose to employ a number of boxes to produce a pirated version of a file via collusion, wherein each box contributes some information or content used to produce the illicit copy after enough such information or content has been accumulated. From the point of view of the traitor, the ideal situation is to redistribute files including variations such that an innocent third party appears to be the culprit. Such redistribution may not occur right away, but may follow a so-called "delayed attack". This complicates the task of traitor tracing, and emphasizes the need to prevent all attacks as much as possible for every broadcast. System 10 enables use of the watermarks in the file segment variations 425, 450, 475 to determine which variations have been rebroadcast.

Consequently, system 10 chooses which file segment variation to employ at each critical file segment of each file for each receiver box, generating variation assignment information traceable to a specific media player. Upon observing a redistributed file or decryption keys, system 10 identifies (and subsequently disables) traitors with the assistance of variation assignment information. System 10 can detect a larger number of colluding attackers for a given bandwidth than any known solution.

System 10 systematically allocates the file segment variations within the augmented file. In one embodiment, allocation is performed based on an error-correcting code. In another embodiment, allocation is performed randomly. The augmented file 500 comprises n critical file segments and q file segment variations for each critical file segment. An assignment of file segment variations to the media player 20 can be represented using a codeword $(x_0, x_1, \ldots, x_{n-1})$ where $0 \leq x_i \leq q-1$ for each $0 \leq i \leq n-1$.

System 10 assigns an inner code to each of the file segment variations. Each of the file segment variations is encrypted with an inner code codeword. The inner code codewords for some or all of the file segment variations are stored in an inner code table. System 10 encodes the inner code and the inner code table with an outer code codeword. The nested inner code and outer code are referenced as a super code. The super code avoids bandwidth limitations by comprising a small number of variations at any single point.

For example, the inner code and the outer code can be Reed-Solomon codes. In a Reed-Solomon code, if q is the alphabet size, $n \leq q-1$ is the length of the code. If k is the source symbol size for the code, then the Hamming distance is $d = n - k + 1$ and the number of codewords is $q^k$. For example, parameters for the inner code can comprise $q_1 = 16$, $n_1 = 15$, and $k_i = 2$, thus the Hamming distance is $d_1 = 14$. Parameters for the outer code can comprise $q_2 = 256$, $n_2 = 255$, and $k_2 = 3$, thus the Hamming distance is $d_2 = 253$. The number of codewords in the outer code for this example is $256^3 = 16{,}777{,}216$. Consequently, this example can accommodate more than 16 million subscribers.

Figure 6:
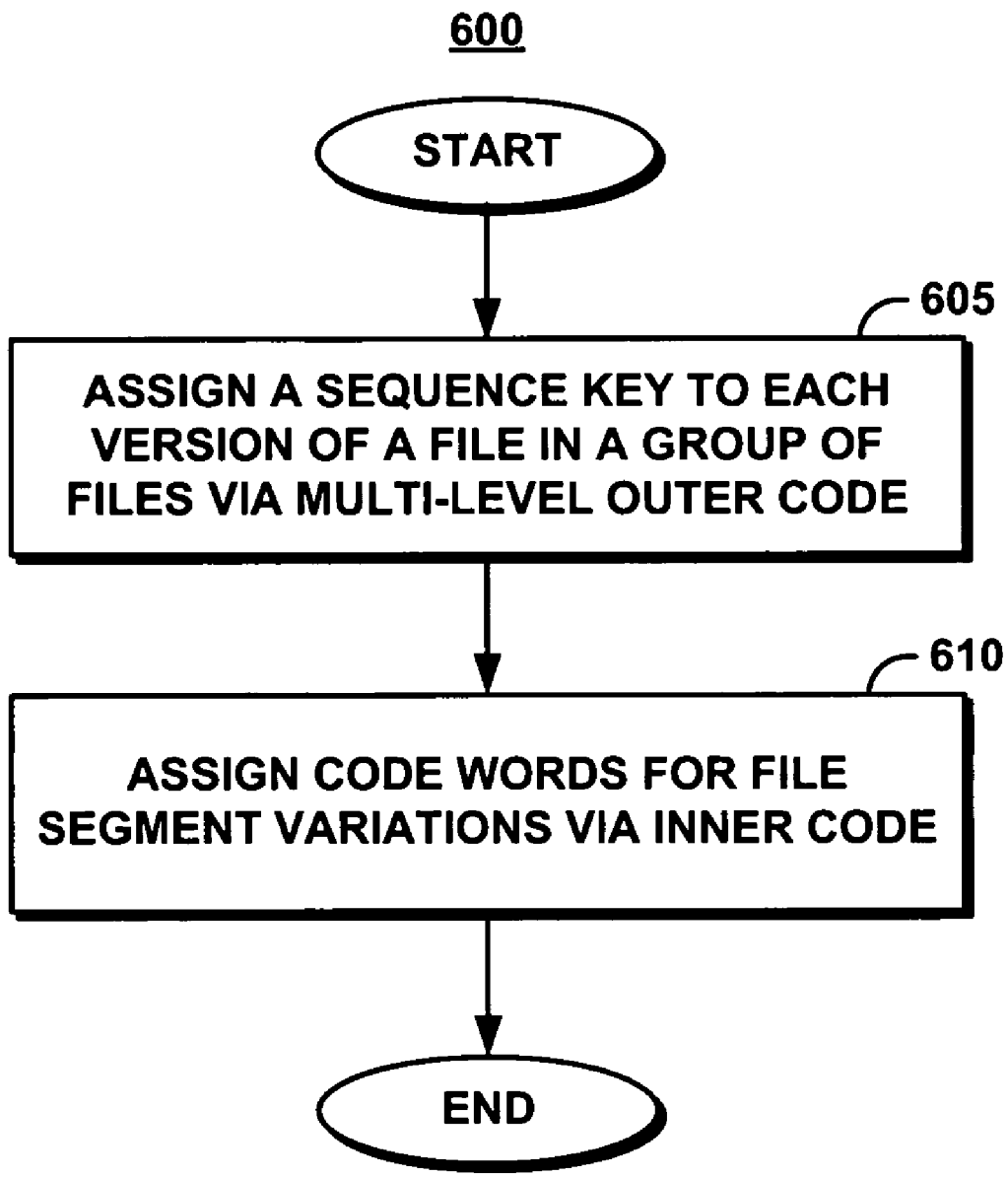
FIG. 6 is a flowchart illustrating a method of assigning a super code for use by the hybrid traitor-trace enabling system of FIG. 1.

FIG. 6 illustrates a method 600 of system 10 in assigning a super code to a group of one or more files and assigning a codeword for each critical file segment variation in a file. Each group of files typically comprises a different super code. The super code provides augmentation selection information to enable proper processing of files. The super code further provides traitor-tracing information. The super code comprises an inner code and a multi-level outer code that operate in a nested manner.

System 10 assigns a sequence key to each version of a file in a group of files via a multi-level outer code (step 605). The multi-level outer code describes which inner code codeword is pertinent to a given media player in each file. Columns in the sequence key matrix correspond to a file sequences; each column corresponds to a specific version of the file such as the augmented file 500. Rows in the sequence key matrix correspond to a sequence key version. Each column in the sequence key matrix can include thousands of rows. For example, the sequence key matrix can comprise 1024 sequence key versions for each file and 255 files are in the entire file sequence. In this case, the sequence key matrix comprises 255 columns and 1024 rows. Each media player is assigned a sequence key from each column, for a total of 255 sequence keys.

The inner code and the multi-level outer code are selected to be maximally different from one another to reduce the likelihood of a group of media players having identical augmentation selection information. In one embodiment, the inner code and the multi-level outer code are selected by error correcting codes such as, for example, Reed-Solomon codes. In another embodiment, the inner code and multi-level outer code are randomly selected. Step 605 is performed during manufacture of the media player 20.

A maximally different inner code codeword is assigned to each file segment variation in each file (step 610). An inner code codeword describes which combinations of file segment variations a particular media player 20 selects. At this point, the exact location of each critical file segment in each file and contents of the critical file segment may not have been determined. However, system 10 has selected inner code codewords for those yet-to-be determined critical file segments. Step 610 is performed when content is encrypted and prepared for transmission or for burning to disk.

The assignment of inner codes may vary randomly so that the pattern of file segment variations employed is not repeated from one broadcast to the next. Similarly, the assignment of multi-level outer codes in each broadcast may also vary randomly so that the pattern of files identified in a group is not repeated from one broadcast to the next. Alternately, the assignment of inner codes and multi-level outer codes may be varied according to the need to identify suspected traitor receivers as certainly as possible. Further, while the number of critical file segments and file segment variations may be kept constant for simplicity, the number of critical file segments and the number of file segment variations may be varied according to an estimate of the probability that a given file will be pirated.

Figure 7:
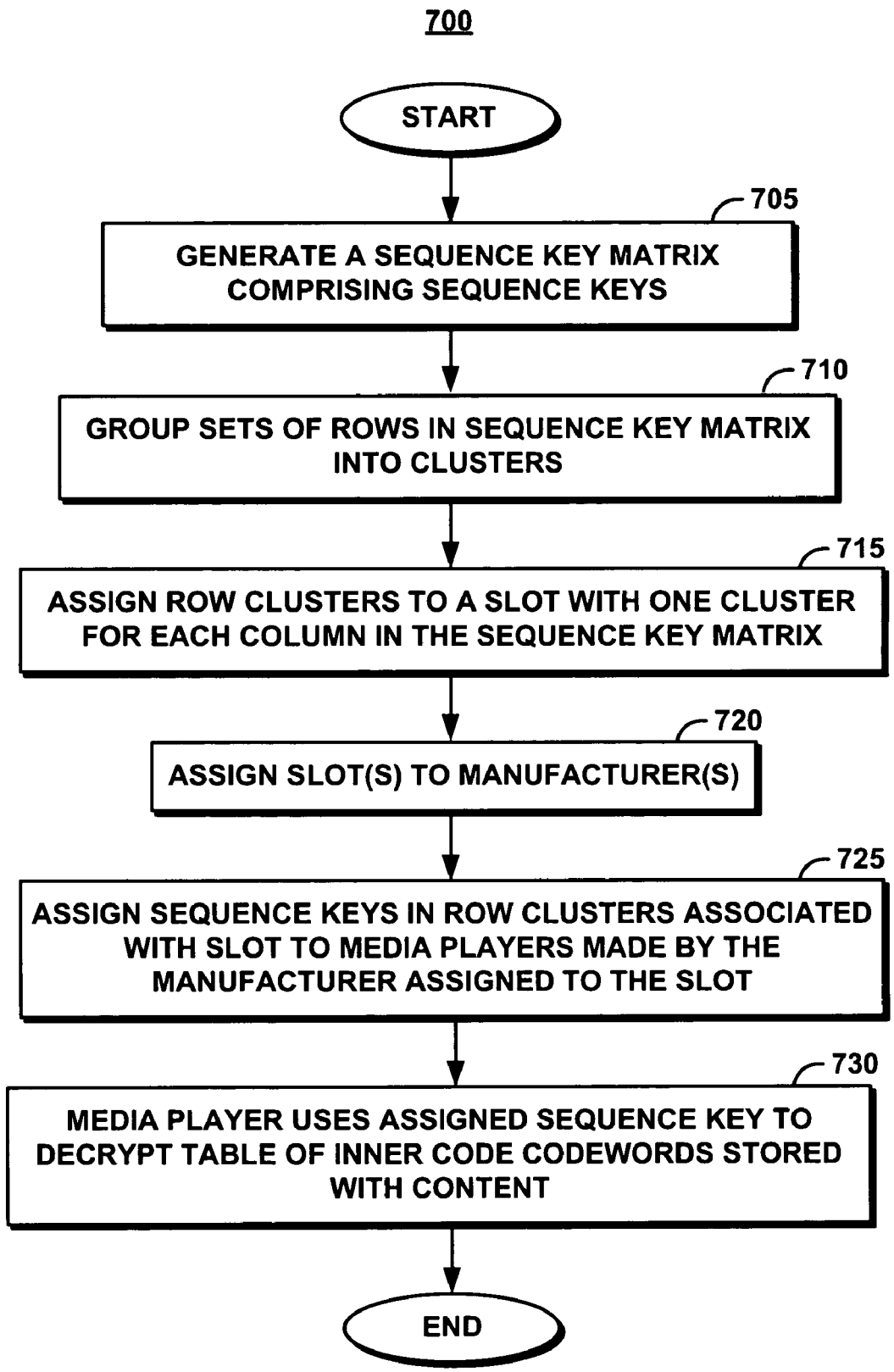
FIG. 7 is a flow chart illustrating a method of the hybrid traitor-trace enabling system of FIG. 1 in generating a manufacturer/model level code and a media player level code in an outer code of the hybrid traitor-trace enabling system of FIG. 1.

FIG. 7 illustrates a method of system 10 in assigning a sequence key slot to a model or manufacturer and assigning a sequence key to an individual media player such as the media player 20. System 10 randomly generates a sequence key matrix comprising sequence keys (step 705). These sequence keys can be randomly generated. System 10 groups sets of rows in a column in the generated sequence key matrix into one or more clusters (step 710). Each cluster comprises a set of contiguous rows in one column. System 10 assigns one or more clusters to a slot (step 715). A slot is an assignment of row clusters with one row cluster per column in the sequence key matrix assigned to the slot. In any given column, any two slots are either identical or disjoint.

System 10 assigns one or more slots to one or more manufacturers, with each manufacturer receiving at least one slot (step 720). System 10 assigns a sequence key in a cell in each row cluster associated with a slot to one or more media players made by the manufacturer to which the slot is assigned (step 725). The media player 20 uses a sequence key from the sequence key table to decrypt the inner code table stored with the content (step 730), allowing the media player 20 to execute or play the group of files. Introduction of slots in the sequence key matrix converts the multi-level outer code of system 10 to a multi-level outer code.

Figure 8:
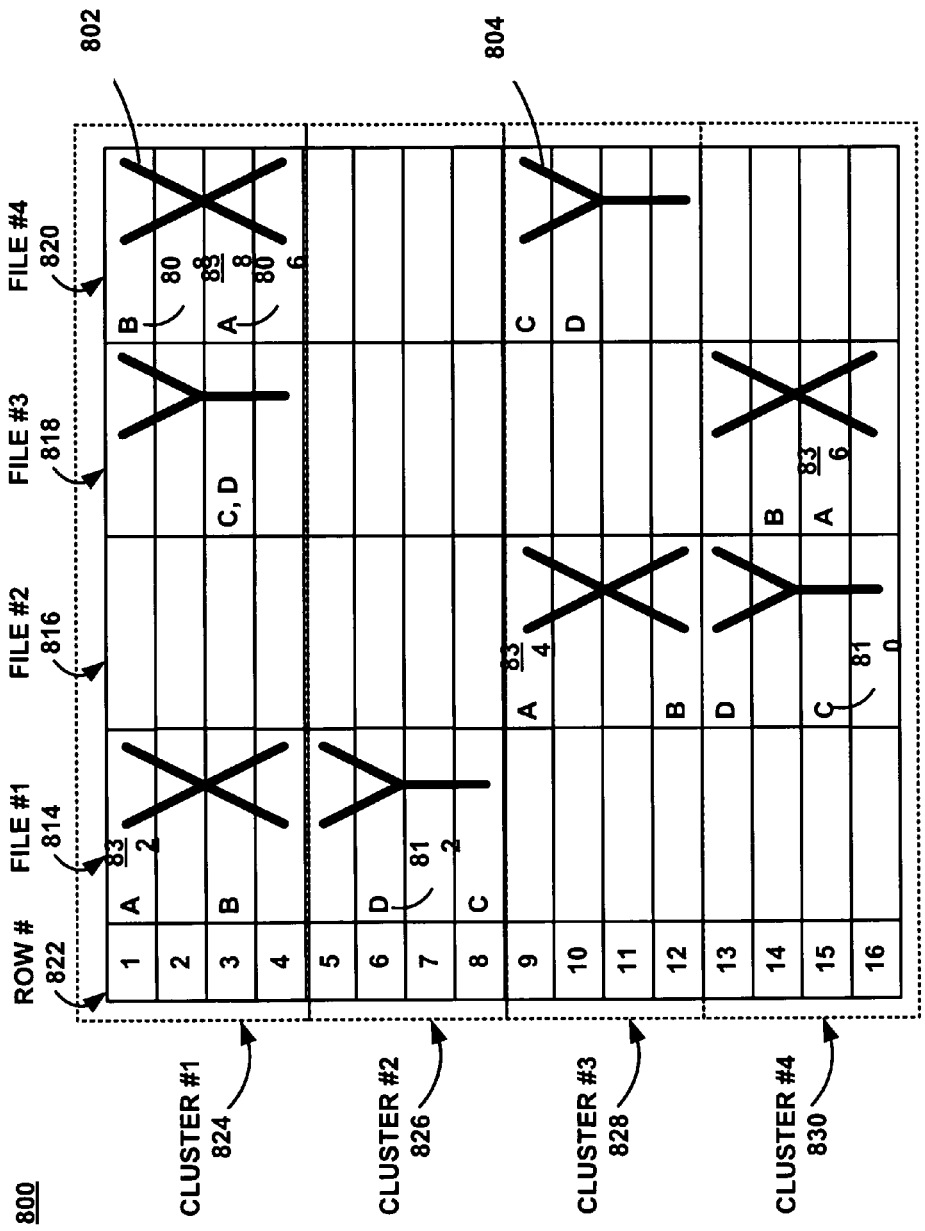
FIG. 8 is a diagram of a sequence key matrix illustrating the manufacturer/model level code and the media player level code generated in the outer code of the hybrid traitor-trace enabling system of FIG. 1.

FIG. 8 illustrates an exemplary sequence key matrix 800 utilizing the multi-level outer code to assign a slot to a manufacturer. The multi-level outer code comprises a manufacturer/model level code and a media player level code. In the example of FIG. 8, model X 802 and model Y 804 are assigned clusters. Model X 802 comprises a media player A, 806, and a media player B, 808. Model Y 804 comprises a media player C, 810, and a media player D, 812.

The sequence key matrix 800 comprises a column for each of the files encrypted by system 10. These columns are labeled as follows: a file #1, 814, a file #2, 816, a file #3, 818, and a file #4, 820. Each row in the sequence key matrix 800 represents a sequence key version numbered as shown in a row # column 822. System 10 groups a row 1, a row 2, a row 3, and a row 4 into a cluster #1, 824 (C1 824); a row 5, a row 6, a row 7, a row 8 into a cluster #2, 826 (C2 826); a row 9, a row 10, a row 11, and a row 12 into a cluster #3, 828 (C3 828); and a row 13, a row 14, a row 15, and a row 16 into a cluster #4, 830 (C4 830).

To form a slot, system 10 selects a cluster from each column in the sequence key matrix 800. System 10 assigns the slot to a manufacturer or a model. In the example of FIG. 8, system 10 assigns to model X 802 a slot A comprising the following clusters: C1, 824, in the column for file #1, 814; C3, 828, in the column for file #2, 816; C4, 830, in the column for file #3, 816; and C1, 824, in the column for file #4, 820. A collapsed notation for the cluster assignment of model X 802 is (C1, 824; C3, 828; C4, 830; C1, 824). System 10 assigns to model Y 804 a slot B comprising the following clusters: C2, 826, in the column for file #1, 814; C4, 830, in the column for file #2, 816; C1, 824, in the column for file #3, 818; and C3, 828, in the column for file #4, 820. A collapsed notation for the cluster assignment of model Y 804 is (C2, 826; C4, 830; C1, 824; C3, 828).

The media player level code is assigned to a media player manufactured by a manufacturer based on relative position within the cluster. For example, system 10 assigns to media player A, 806, position 1, 832, in C1, 824; position 1, 834, in C3, 828; position 3, 836, in C4, 830; and position 3, 838, in C1, 824. In collapsed notation, the positions assigned to media player A, 806, are (1, 1, 3, 3). Similarly, media player B, 808, is assigned positions (3, 4, 2, 1) within the clusters assigned to model X 802. Media player C, 810, is assigned positions (4, 3, 3, 1) within the clusters assigned to model Y 804. Media player D, 812, is assigned positions (2, 1, 3, 2) within the clusters assigned to model Y 804. The multi-level outer code of system 10 allows assignment of media players with respect to manufacturers or models, allowing system 10 to trace traitors with respect to manufacturer, model, or the media player 20.

In another example, system 10 comprises 512 possible sequence key versions with 255 files in the file sequence. System 10 prepares 512 inner code tables for the purpose of traitor tracing and encryption. System 10 divides the 512 possible sequence keys into 32 clusters, with each cluster comprising 16 sequence keys. The manufacturer/model level code provides cluster assignments to manufacturers or models through the 255 columns representing the file sequence. The cluster assignments comprise the slots assigned to the manufacturers or models. Consequently, the manufacturer/model level code has q=32 and n=55. A given manufacturer or model may receive one or more slot assignments. The media player level code assigns sequence keys to media players within a slot. Consequently, the file player level code has q=16 and n=255.

System 10 can be configured to meet the differing requirements of a variety of scenarios in which different resource limitations are applied. For example, extra transmission bandwidth may be available for some scenarios such as, for example, downloading of content. In this case, additional space is provided for inner code tables; consequently, additional critical file segments and additional file segment variations can be used in the augmented file 500. For example, 256 file segment variations per critical file segment can be used. Furthermore, if a distribution scenario emphasizes protection against encryption key theft, system 10 may be configured with $q \geq 256$.

In one embodiment, a maximum distance separator (MDS) code is used for the manufacturer/model level code, the media player level code, and the inner code. In another embodiment, a Reed-Solomon code is used for the manufacturer/model level code, the media player level code, and the inner code. Although reference is made to the MDS code as a preferred embodiment, it should be clear that when the MDS code is not available, it might be possible to use any other available code, such as BCH code.

In an embodiment in which system 10 is configured with $q \geq 256$, a BCH code is used for the manufacturer/model level code, the media player level code, and the inner code. For example, a q=32, k=3, n=255 code allows accommodation of approximately 32,000 manufacturer models. Another q=16, k=4, n=255 code is used to assign sequence keys to approximately 65,536 media players within each manufacturer model. Each sequence key has 512 versions. Consequently, the number of media players that can be accommodated by system 10 in this configuration is approximately 2 billion. In this example, the augmented file 500 is prepared with 512 inner code tables. The augmented file 500 can, for example, have 512 versions with each version corresponding to one inner code table. Alternatively the augmented file can have 256 versions with each version corresponding to two inner code tables, each of which are encrypted with different sequence keys. System 10 comprising q=16 and k=4 can accommodate approximately 65,000 manufacturers or models and 4 billion media players. In this example, each sequence comprises 256 versions. The augmented file 500 is prepared with 256 inner code tables.

In yet another example, each sequence key comprises 1024 versions and each augmented file 500 is prepared with 1024 inner code tables. In this case, system 10 comprises q=64, k=2, n=255, allowing accommodation of approximately 4096 manufacturers or models. Another q=16, k=5, n=255 code is used to assign sequence keys to media players within models. In this example, system 10 can accommodate 4 billion media players. If the inner code comprises 256 versions for an augmented file 500, then each file version corresponds to four identical inner code tables and each inner code table is encrypted with a sequence key.

Figure 9:
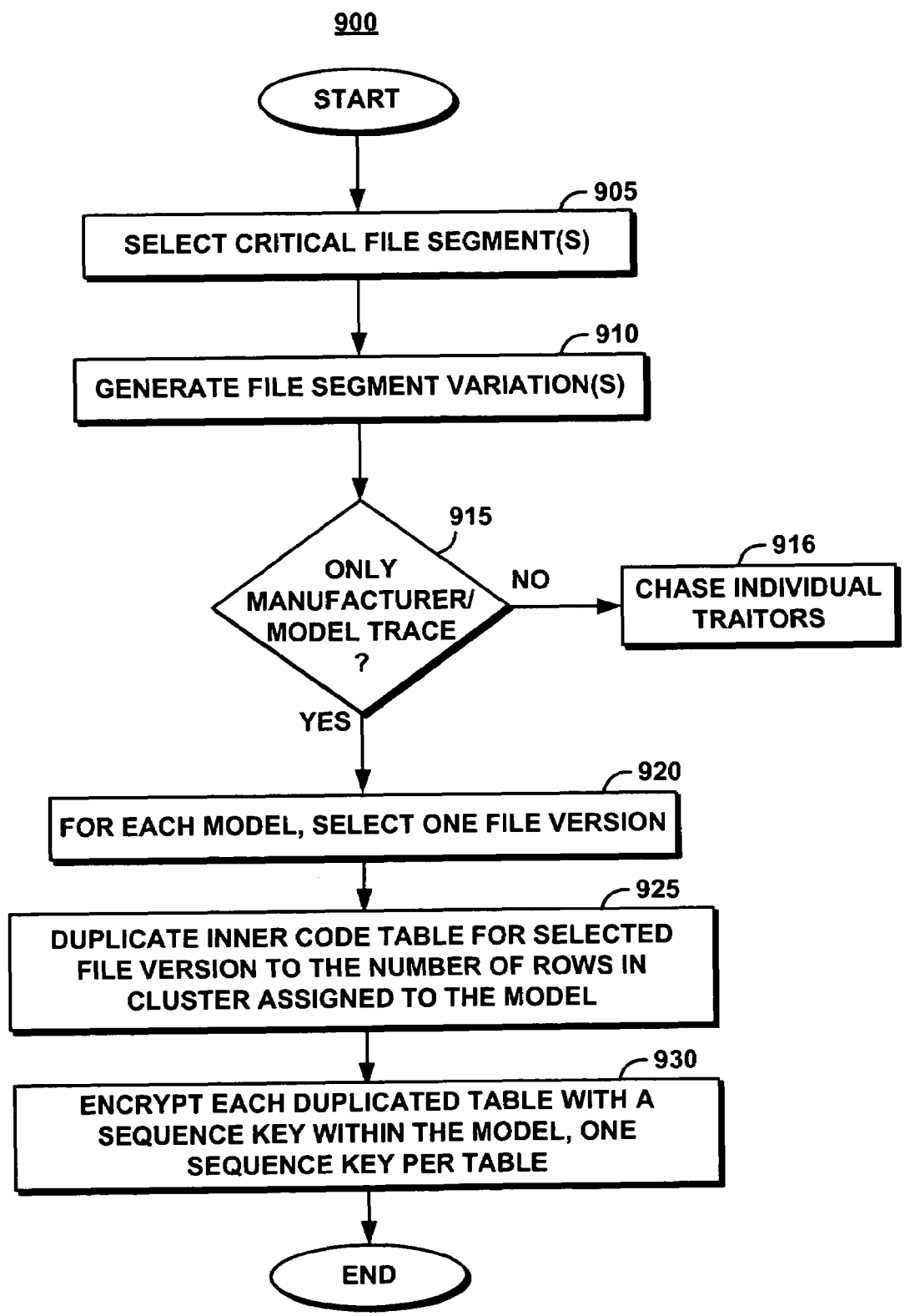
FIG. 9 is a flow chart illustrating a method of the traitor-trace enabling system of FIG. 1 in generating a sequence key matrix for use by the outer code based on a selected traitor-trace focus.

FIG. 9 illustrates a method 900 of system 10 in generating a sequence key matrix for use by the multi-level outer code based on a selected traitor-trace focus. For each file, one or more critical file segments are selected (step 905). For each critical file segment, one or more file segment variations are generated (step 910) to replace each critical file segment, forming an augmented file. System 10 determines at decision step 915 whether traitor traces are restricted to manufacturers and models only (step 915). If yes, system 10, for each model, selects one file version (step 920). For the selected file version and the selected model, system 10 duplicates the inner code table (m+1) times (step 925); i.e., if m=255, system 10 duplicates the inner code table 256 times. As used herein, m refers to the number of sequence key versions (or rows) within the cluster that was assigned to the model. System 10 encrypts each of the duplicated inner code tables with a sequence key within the model, one sequence key per table (step 930).

If, at decision step 915, system 10 determines that traitor traces are not restricted to manufacturers and models only, then system 10 starts chasing individual traitors (step 916) using available techniques, such as for example, the technique described in U.S. application Ser. No. 11/231,174, filed concurrently herewith, and titled "System and Method for Assigning Sequence Keys to a Media Player to Enable Flexible Traitor Tracing", which is incorporated herein by reference in its entirety.

Figure 10:
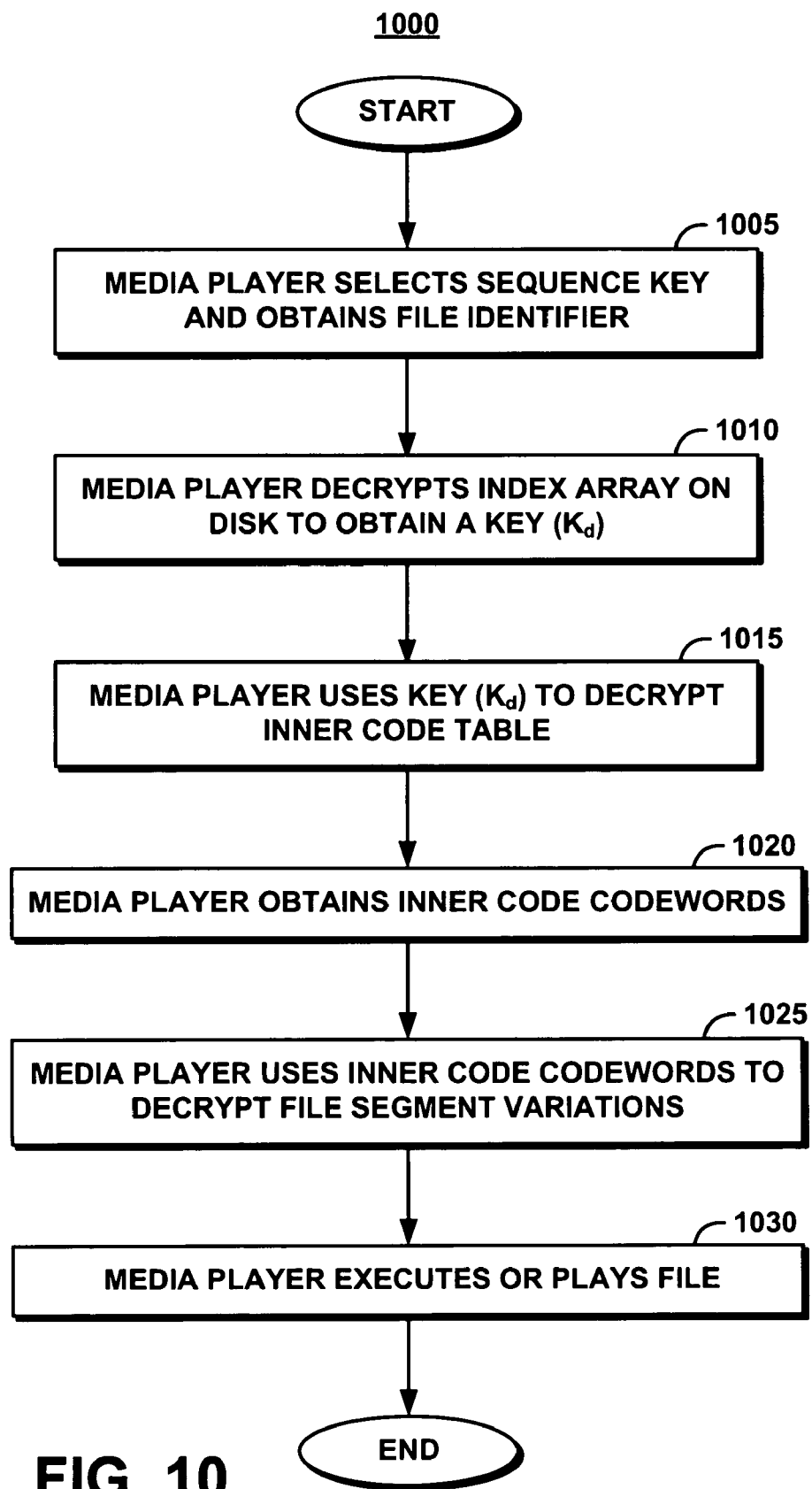
FIG. 10 is a flow chart illustrating a method of a media player of FIG. 1 in executing or playing a file encrypted by the hybrid traitor-trace enabling system of FIG. 1.

FIG. 10 illustrates a method 1000 of the media player 20 executing or playing a file encrypted by system 10. The media player 20 selects a sequence key and obtains a file identifier (step 1005). The media player 20 decrypts an index array on the disk to obtain a key, $K_d$ (step 1010). The media player 20 uses the key, $K_d$, to decrypt the inner code table (step 1015). The media player obtains the inner code codewords corresponding to the sequence key (step 1020). The media player uses the inner code codewords to decrypt the file segment variations (step 1025). The media player 20 executes or plays the file (step 1030).

Figure 11A:
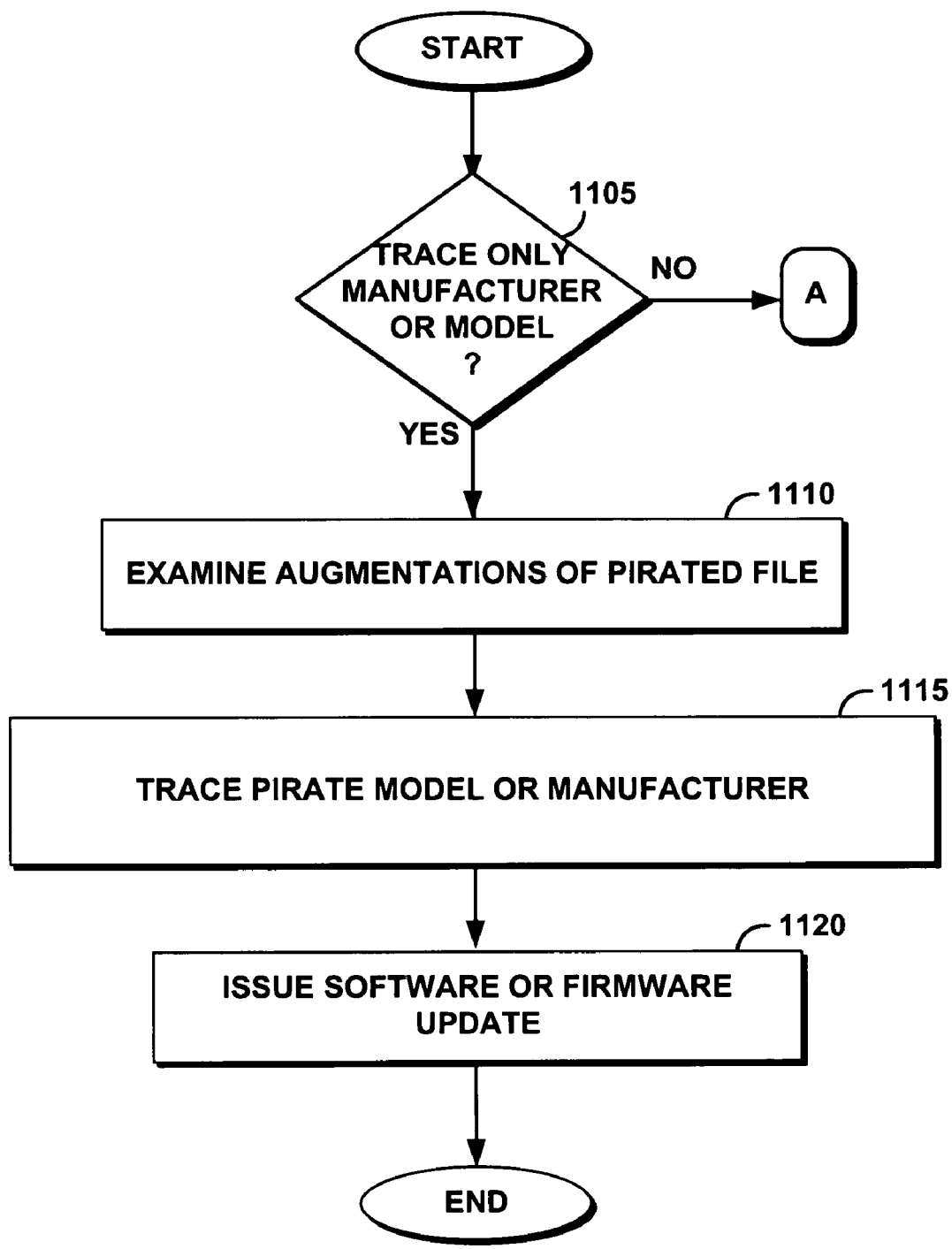
FIG. 11 is comprised of FIGS. 11A and 11B and represents a flow chart illustrating a hybrid traitor-tracing method enabled by the hybrid traitor-trace enabling system of FIG. 1.
Figure 11B:
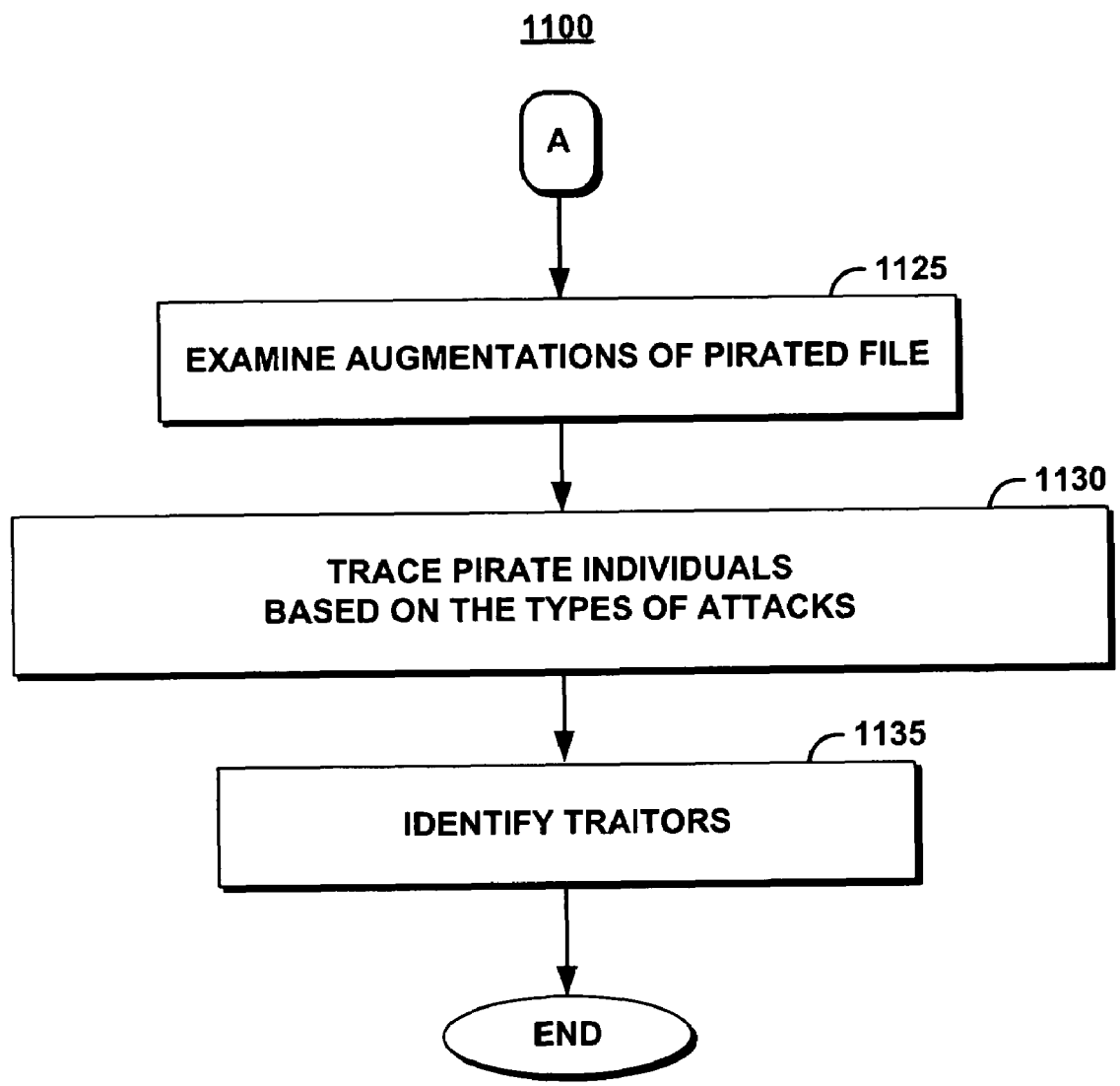

FIG. 11 (FIGS. 11A, 11B) illustrates a method 1100 of system 10 in tracing traitors; i.e., identifying and disabling traitor receivers is shown, according to an embodiment of the present invention. A determination is made whether to trace only a manufacturer or model (decision step 1105).

If only a manufacturer or model is to be traced, available techniques for tracing the pirate manufacturer or model could be used. As an example, a redistributed or pirated version of a file (a pirated file) could be examined to determine augmentations of the pirated version (step 1110). These augmentations comprise file segment variations. A comparison is made between the augmentations and the super codes or manufacturer/model level codes previously assigned to authorized media players, to determine which manufacturers or models are most likely the source of the pirated file (step 1115). When a manufacturer or model is traced, a software or firmware update is issued to correct faulty models (step 1120). In the even an evil manufacturer is identified, legal action may also be instituted at this point.

If media players are included in the trace (decision step 1105), available techniques for tracing the pirate individuals could be used. As an example, a redistributed or pirated version of a file could be examined to determine augmentations of the pirated version. These augmentations comprise file segment variations (step 1125). A comparison is made between the augmentations and the super codes, manufacturer/model level codes, media player level codes, or inner codes previously assigned to authorized media players, to determine which media player (or media players) are most likely compromised (step 1130). When a traitor is traced, the dynamic subset of users authorized to receive the broadcast is changed by excluding the traced traitor (step 1135); legal action may also be instituted at this point.

The examination comprises calculating, for each media player, the number of file segment variations that a media player matches with each observed pirated file. The examination can reveal a single file rental media player having every assigned file segment variation that was used in the pirated file and reveal that the watermarks used also match, for a deterministic identification of the traitor. Conventional approaches attempt to determine the traitor as quickly as possible by analyzing a single file; however, in the case where attackers are colluding, this approach does not adequately distinguish the culprits. Instead, with the super code design of system 10 there may be thousands of media players that have exactly the same variations for a given file (as determined by the inner code), but these media players are distinguished in subsequent files via the multi-level outer code. Since an attack is only economically hurtful if the attackers rebroadcast many files, the approach of system 10 is sufficient. Consequently, a single group of files, corresponding to a single super code, can be sufficient to identify a group of colluding traitors.

Further, the comparison may comprise a count of the number of watermarked file segment variations in the pirated file corresponding to each media player among a number of media players collectively compromised by colluding attackers. A ranked list of media players can be generated according to the number of file segment variations of each media player used in the pirated file. The media player that has the highest number of file segment variations matching with the redistributed file is incriminated, and is not given any new decryption keys. In other words, a list of suspected traitors can be generated according to the number of file segment variations from each that are used in a pirated file. Thus, even when the suspected traitor numbers become too big for a deterministic identification, the present invention can probabilistically identify and disable the compromised media player without harming innocent users.

It is also within the scope of this invention to exclude more than one media player for each super code sequence. The broadcaster can exclude the top two media players, or the top three media players, etc. This defeats the attack sooner, but at the cost of increasing the chance of falsely incriminating an innocent media player. Of course, there are non-technical ways to help determine the difference between innocent and colluding media players. For example, consumer that calls to complain that a media player no longer works and is willing to have a service call to fix the media player is likely to be innocent.

The method 1100 is repeated for the next super code group of files; for example, the next group of 255 files. Eventually the attack stops because all compromised media players have been excluded.

The attackers are unable to calculate the actual assignments for any media players but their own; otherwise, the attacker can incriminate an innocent media player. Therefore, an additional feature of the invention is to randomly permute code assignments at each code position (each critical file segment in the file), and in each file itself. For example, if a Reed-Solomon code suggests that a given media player receive variation #1 at a certain point in a certain file, the assignment of variation number to the actual broadcast order is permutated; consequently, variation #1 is rarely the first variation broadcast.

After the sequence keys are assigned based on slots, the sequence keys are stored inside the media players. The inner code tables are stored on a disk with the content. System 10 can generate more key versions per each sequence key than the number of file versions actually created from the inner code. For the sake of simplicity in the discussion of system 10, the number of file versions created from the inner code is considered equal to the number of sequence key versions for each sequence key. Even when system 10 enables tracing to manufacturers, models, or media players, the number of tables on the disk stored on disk is not increased. For example, if the inner code creates 256 file versions and each sequence key comprises 256 versions, there are 256 different tables on the disk, each table encrypted with a different sequence key.

When tracing only to a manufacturer, sending the same file version to the individual media players of the same model can disable the capability of tracing to media players. System 10 chooses a file version from the cluster; the corresponding table for the cluster can be duplicated a sufficient number of times to equal the number of media players within each cluster. Each duplicated table is encrypted with one of the sequence keys within the cluster. In the example previously described, the 512 rows are divided into 32 clusters and there are 16 rows in each cluster. Instead of having 512 different tables as is the case when allowed to trace to media players, there are only 32 different tables, but each of the 32 tables is duplicated 16 times. All the 16 media players within the same cluster use their own sequence keys to encrypt the 16 identical tables for the cluster. In this case, the number of total tables for the file on the disk is still 512, the same number of tables stored on disk as when tracing to media players. However, some of the file versions are not used; instead, only 32 versions are used. In this scenario, tracing to media players is not enabled because every media player within the same model receives the same file version.

System 10 enables the detection of a manufacturer/model using fewer recovered pirated files than required for tracing to media players. After system 10 performs the sequence key assignment, the multi-level outer code used for manufacturer/model tracing is simply the manufacturer/model level code used for slot assignment. However, the media player level code used for tracing media players is the combination of the levels of the assignment previously described. In this example, the multi-level outer code used for tracing models is q=32, n=255, with Hamming distance $d_1$, namely the [255, $k_1$, $d_1$] code. The multi-level outer code used for tracing media players is the combination of q=32, [255, $k_1$, $d_1$] code and q=16, [255, $k_2$, $d_2$] code. Therefore, the multi-level outer code is q=512, [n=255, $k_1*k_2$, $d_1*d_2$] for tracing media players. The property of the multi-level outer code and the inner code determines that it is more efficient for tracing only to models than tracing to media players. After a model is detected, the traitor media player(s) can also be detected with additional recovered pirated files.

The hybrid traitor-tracing scheme enabled by system 10 allows detection of both collusion between manufacturers/models and collusion between media players. The traceability against collusion between models depends on the manufacturer/model level multi-level outer code, and the traceability against collusion between media players depends on the combination of the multi-level outer code and the inner code.

In an alternative embodiment, one approach to a hybrid traitor tracing that could be used in conjunction with the present invention, is to store, for example, additional sets of sequence keys in the media player. One set of sequence keys are used to trace a manufacturer or model; another set of sequence keys are used to trace an individual media player. However, this approach requires additional storage for sequence keys in the media player, increasing cost for manufacturers of media players.

Another alternative embodiment is for a hybrid traitor tracing to use the number of video object unit tables squared, rather than just the number of video object tables. For example, 256 video object unit tables (further referenced as tables or inner code tables) are used in a system. Each media player stores 255 sequence keys assigned to the media player based on a scheme for tracing an individual media player. Tracing an individual media player requires 256 tables on a disk comprising encrypted content. A corresponding sequence key for the corresponding file encrypts each table. For example, for file #44, the table #i is encrypted by sequence key #i for file #44.

It is to be understood that the specific embodiments of the invention that have been described are merely illustrative of certain applications of the principle of the present invention. Numerous modifications may be made to the system and method for assigning sequence keys to a media player to enable hybrid traitor tracing described herein without departing from the spirit and scope of the present invention. Moreover, while the present invention is described for illustration purpose only in relation to error correcting codes such as the Reed-Solomon code, it should be clear that the invention is applicable as well to, for example, an MDS code, random selection, a BCH code, etc. Any type of encoding scheme can be used by the invention.

What is claimed is:

1. A processor-implemented method of performing traitor tracing with a plurality of sequence keys assigned to a file, the method comprising:
generating a multi-level outer code comprising at least two levels of code;
assigning the sequence keys by using the multi-level outer code,
  wherein the multi-level outer code comprises:
    first level of code for assignment to a cluster of the sequence keys to different manufacturers of media devices; and
    a second level of code for assignment to the media devices capable of reading the sequence keys within the cluster; and
generating a plurality of file versions from different segment variations;
choosing one of the file versions and duplicating a table for the cluster of sequence keys to a number equal to the number of media devices within the cluster;
encrypting the duplicated table with one of the sequence keys within the cluster of sequence keys;
calculating for each of the media devices a number of the segment variations that the media device matches with the file; and
playing the file on a media player, and tracing the media player after the media player plays the file.

2. The method of claim 1, further comprising assigning the sequences keys to the first level of code for assignment to a cluster of the sequence keys to different models of the manufacturers' media devices.

3. The method of claim 1, wherein generating the file versions comprises using an inner code, and the inner code and the multi-level outer code are selected to be maximally different from each other.

4. The method of claim 3, wherein the inner code is based on an error-correcting code.

5. The method of claim 1, wherein at least one level of the multi-level outer code is based on an error-correcting code.

6. The method of claim 1, wherein, for tracing a pirate manufacturer model, assigning a file version to a manufacturer's model based on the first level of the outer code.

7. The method of claim 6, further comprising assigning one or more of the sequence keys to each file version, all the sequence keys within the manufacturer's model being assigned to the file version.

8. The method of claim 7, further comprising generating a variation table that maps each of the sequence keys to the assigned file versions.

9. The method of claim 8, further comprising encrypting each entry in the variation table with any one of: a sequence key or a derivative of the sequence key mapped to said each entry.

10. The method of claim 1, further comprising assigning one or more sequence keys to each file version.

11. The method of claim 10, further comprising generating a variation table for mapping the sequence keys to the assigned file versions.

12. The method of claim 11, further comprising encrypting each entry in the variation table with any one of: a sequence key or a derivative of the sequence key mapped to said each entry.

13. A computer program product having program codes stored on a computer readable storage medium for performing traitor tracing with a plurality of sequence keys assigned to a file, the computer program product comprising:

a program code recorded on a computer readable storage medium for generating a multi-level outer code comprising at least two levels of code;

a program code for assigning the sequence keys by using the multi-level outer code;

wherein the multi-level outer code comprises:

- a first level of code for assignment to a cluster of the sequence keys to different manufacturers of media devices; and
- a second level of code for assignment to the media devices capable of reading the sequence keys within the cluster; and a program code utilizing a computer processor for generating a plurality of file versions from different segment variations;

a program code choosing one of the file versions and duplicating a table for the cluster of sequence keys to a number equal to the number of media devices within the cluster; and a program code encrypting the duplicated table with one of the sequence keys within the cluster of sequence keys.

14. The computer program product of claim 13, further comprising a program code for assigning the sequences keys to the first level of code for assignment to a cluster of the sequence keys to different models of the manufacturers' media devices.

15. The computer program product of claim 13, wherein the program code for generating the file versions comprises a program code that uses an inner code.

16. The computer program product of claim 15, wherein the inner code is based on an error-correcting code.

17. The computer program product of claim 13, wherein at least one level of the multi-level outer code is based on an error-correcting code.

18. The computer program product of claim 13, wherein, for tracing a pirate manufacturer model, a program code assigns a file version to a manufacturer's model based on the first level of the outer code.

19. The computer program product of claim 18, further comprising a program code for assigning all the sequence keys within the manufacturer's model to the assigned file variation.

* * * * *

UNITED STATES PATENT AND TRADEMARK OFFICE
CERTIFICATE OF CORRECTION

PATENT NO. : 7,630,497 B2
APPLICATION NO. : 11/230843
DATED : December 8, 2009
INVENTOR(S) : Lotspiech et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1115 days.

Signed and Sealed this

Second Day of November, 2010

David J. Kappos
*Director of the United States Patent and Trademark Office*